United States Patent [19]

Robinson

[11] Patent Number: 4,891,204

[45] Date of Patent: Jan. 2, 1990

[54] PURIFICATION OF ALUMINUM CHLORIDE

[75] Inventor: Michael Robinson, Wooton, England

[73] Assignee: SCM Chemical Limited, United Kingdom

[21] Appl. No.: 898,869

[22] Filed: Aug. 20, 1986

Related U.S. Application Data

[63] Continuation of Ser. No. 751,293, Jul. 2, 1985, abandoned.

[30] Foreign Application Priority Data

Jul. 21, 1984 [GB] United Kingdom .................... 18639

[51] Int. Cl.$^4$ .............................................. C01F 7/62
[52] U.S. Cl. .................................... 423/495; 423/496; 423/116; 423/121; 423/133; 423/135; 75/109; 75/121
[58] Field of Search ............... 423/116, 121, 133, 135, 423/495, 496; 75/109, 121

[56] References Cited

U.S. PATENT DOCUMENTS

| | | | |
|---|---|---|---|
| 1,269,236 | 6/1918 | Weaver | 423/135 |
| 1,645,143 | 10/1927 | Humphrey et al. | 423/135 |
| 2,843,455 | 7/1958 | Pardee | 423/112 |
| 4,252,774 | 2/1981 | Loutfy et al. | 423/495 |
| 4,514,373 | 4/1985 | Wyndham | 423/495 |

Primary Examiner—Robert L. Stoll
Attorney, Agent, or Firm—Lieberman, Rudolph & Nowak

[57] ABSTRACT

Aluminium chloride contaminated with iron chloride is purified by contacting it in vapor form with a bed of particles of aluminium metal interspersed with particles of a chemically inert material. The efficiency of the process may be maintained by acid treating, drying and recycling the bed material. The process may be applied to aluminium chloride produced by the chlorination of a bauxite beneficiate.

14 Claims, No Drawings

PURIFICATION OF ALUMINUM CHLORIDE

This is a continuation of co-pending application Ser. No. 751293 filed on 07/02/85, now abandoned.

Priority is claimed from United Kingdom application No. 8418639 filed July 21, 1984.

This invention relates to the purification of aluminium chloride.

The Bayer process has long been an important route to the production of aluminium compounds from relatively high grade bauxites. Bayer process alumina contains a relatively low content of impurity oxides, such as iron oxide, and is a suitable raw material for the production of highly pure aluminium chloride.

There have been attempts to utilize lower grade bauxites for the production of aluminium chloride by direct chlorination processes. Such processes, even those utilizing a preliminary benefication step comprising the selective chlorination of iron values followed by the chlorination of the alumina residue to produce aluminium chloride, have provided a product having a substantial content of iron chloride.

U.S. Pat. No. 1269236 discloses the purification of aluminium chloride with respect to its iron chloride content by feeding liquid aluminium chloride into a bath of molten aluminium whereupon, "due to the greater affinity of the chlorine for the aluminium than for the iron the chlorine releases the iron and takes on the proper share of aluminium". Alternatively the aluminium chloride may be fed to the bath in powdered form.

U.S. Pat. No. 2843455 discloses a process for the purification of vaporous aluminium chloride contaminated with iron chloride by treating it with a permeable material carrying a deposit of aluminium metal on its surface. The disclosed process is a cyclic two-stage process comprising first depositing iron metal on the supporting material, passing some of the contaminated aluminium chloride at a temperature of approximately 1800° F. (982° C.) over the iron-carrying material to effect deposition of metallic aluminium on it with the concurrent production of additional vaporous iron chloride, separately recovering the resulting twice-contaminated aluminium chloride and passing a further quantity of the contaminated aluminium chloride over the material at a temperature of approximately 1000° F. (538° C.) to effect deposition of metallic iron on the material in place of the aluminium and to reform the aluminium into vaporous aluminium chloride. The production of a stream of aluminium chloride having an increased contamination of iron chloride is a disadvantage of this process.

The present invention provides a process for the purification of aluminium chloride contaminated with iron chloride comprising contacting the aluminium chloride in vapour form with a bed of particles of aluminium metal interspersed with particles of a chemically inert material.

By chemically inert is meant herein non-reactive with the constituents of the aluminium chloride or with aluminium metal at the temperature prevailing, which is preferably at least 350° C. but below the melting point of the aluminium particles.

Where the aluminium chloride has been produced by the chlorination of an iron-containing mineral such as bauxite it will have a content of contaminating chlorides other than as iron, some of which may react with the metallic aluminium to enhance the yield of aluminium chloride and some of which will not but are separable from the aluminium chloride by condensation e.g., manganese chloride, together with a content of carbon oxides and inert gases. A reference to contaminating iron chloride herein includes reference to other reactive contaminating chlorides accompanying it.

While it may be possible to operate a process similar to the present in a small laboratory scale reactor, e.g. one having an internal diameter of below 5 cm, without the presence of the particles of the chemically inert material it was found that in even slightly larger reactors, for example in reactors in excess of 10 cm diameter, sintering of the aluminium particles occurred at nominal reactor temperatures well below the melting point of aluminium of 660° C. This prevented the use of a moving bed. It is thought that the presence of the chemically inert material may act to conduct heat away from hot-spots which are an increasing problem as reactor scale increases. In the context of a moving bed being preferred the chemically inert material, besides preferably being a good conductor, preferably also has a not unduly high internal friction and, particularly preferably, has an internal friction lower than that of the aluminium particles.

Preferably the chemically inert material is a coke. Within the term coke is included products produced by the devolatilization of coals. It is found that coals, preferably those of low volatile content, and preferably also having a low caking tendency, may be devolatilized by heating in the absence of oxygen, or in the presence of only sufficient oxygen to provide combustion heat to conduct the devolatilization, to produce a suitable chemically inert material which is efficient in heat conductivity, has low internal friction, and has a relatively low tendency to produce fines in a moving bed. Other forms of coke than the direct product of coal devolatilization may be used, provided that they are in a reasonably non-friable particulate form.

Other chemically inert materials which may be used are refractory materials such as, for example, alumina or silica.

The coals preferred as a source of coke are those with a volatiles content of at least 4% but below 30%, particularly preferably below 20% for example, suitably, below 10% by weight. Examples of such coals are the meta- or semi-bituminous coals, the carbonaceous coals or the anthracites according to Seyler's classification as quoted in "Chemistry of Coal Utilization" by H. H. Lowry, published by John Wiley & Sons, New York (1963) page 30, although the latter, including the semi-anthracites, are preferred. The coking operation may be conducted by heating up to a temperature of from about 600° C. to 1000° C. for from about 15 minutes to 3 hours very suitably for from 30 minutes to 2½ hours. This may be conducted in an externally heated furnace or by combusting a small proportion, preferably less than 5% weight of the carbon in gases containing a suitably restricted quantity of oxygen.

The size of the aluminium particles are preferably such as to allow a reasonable surface area for reaction. Preferably, to allow for ease of handling, the particles are at least 2 mm in average diameter. Particles above 10 mm in diameter are not preferred. Preferably the particle size of the chemically inert material is matched, at least approximately, to that of the aluminium to prevent segregation in a moving bed.

The proportion of chemically inert material need not essentially be such that all contact between the aluminium particles is prevented. At one end of the scale of proportions the requirement is to provide a sufficient heat sink to prevent sintering and, at the other end of the scale, not to unduly reduce the total surface area of aluminium available for reaction. A suitable preferred range is from 0.8:1 to 2:1 by volume inert material-:aluminium.

It is found that in a process for the purification of aluminium chloride contaminated with iron chloride by contacting the aluminium chloride in vapour form with particles of aluminium metal in the form of a bed, including the process of the present invention, if the bed particles are removed and treated to remove at least some deposited iron from them and returned to the bed, either intermittently or continuously, the efficiency of the process may be maintained at a high level. Operation of the bed in a column with plug flow from top to bottom, or vice versa, of the bed solids is the preferred way of achieving the desired turn-over of bed solids. The rate of removal for treatment of bed solids is preferably optimized by experiment. Suitable rates are envisaged to be from 5% to 30%, preferably 8% to 25% by volume of the bed per hour.

It has been found that the bed solids may be treated satisfactorily to remove metallic iron by contacting them with dilute aqueous acid, for example at 10% to 50% wt concentration and very suitably from 10% to 25% concentration for at least 1 minute in total and suitably for not more than 5 minutes although a longer treatment period, for example up to 30 minutes, may be used if desired. The temperature of treatment may be ambient temperature. Preferrably, the acid-treated particles are then water washed before return to the bed. To prevent or reduce deactivation of the cleaned surface the acid-treated and preferably water washed particles are preferably dried, to remove surface water for example at a temperature in the range 90° C. to 150° C. Preferably the drying is completed within 30 minutes, particularly preferably within 15 minutes of the completion of the washing process and preferably within that time from the completion of the acid treatment. This method of treatment has the advantages of not requiring the separation of the particles of the chemically inert material from the aluminium particles before treatment and the availability of usable dilute hydrochloric acid as a waste by-product of the aluminium chloride production process. The acid may be an aqueous solution of any other strong mineral acid if desired e.g. sulphuric acid although due to the introduction of sulphate or other ions into the process these are not preferred.

An alternative method for treating the aluminium particles is to scour their surfaces mechanically to remove a thin surface layer including the deposited iron. If the chemically inert material is not sufficienctly durable to withstand this treatment e.g. if it is a carbon product, it is preferably removed e.g. by flotation methods or by magnetic methods based on the presence of the metallic iron on the aluminium particles. A suitable method for mechanically removing a surface layer is by milling, using non-ferrous equipment, for example by sand milling, the sand being easily separable from the aluminium afterwards on the basis of the difference in density or particle size.

The flow of iron chloride-contaminated aluminiun chloride through the bed of aluminium particles is suitably countercurrent to the flow of at least a portion of the aluminium particles which particles may be housed in a single, or in multiple contactors.

The vaporous aluminium chloride, after contact with the aluminium particles, contains a reduced proportion of vaporous iron chloride and is suitably passed through a cyclone operating at a temperature at, or above, the boiling point of the aluminium chloride, and at or below the solidification temperature of the iron chloride e.g. at a temperature of from 182° C. to 250° C., to remove ferrous chloride as dust. The aluminium chloride may then be condensed and the residual gases containing, in vapour form or as entrained dust, residues of aluminium chloride, and low boiling chlorides such as silicon tetrachloride and titanium tetrachloride, are preferably contacted with water in a recirculating scrubber to produce dilute hydrochloric acid. It is found that acid of concentration above 10%, e.g. up to 15% by weight concentration may be produced by this means and that this acid may be utilized to remove the coating of metallic iron from the aluminium particles.

The invention will now be illustrated with reference to the following example.

The apparatus comprised two vertically positioned cylindrical contactors each of internal diameter 155 mm and internal height 2.0 m each fitted with aluminium particle supply means at their tops and aluminium particle removal means at their lower ends, the first contactor being fitted with supply means for the vaporous contaminated aluminium chloride at its lower end, with removal means at its topconnected via a conduit to the top of the second contactor. The second contactor is fitted with gaseous aluminium chloride removal means at its lower end. The aluminium particles are stored in a preheating hopper connected via plug valves and separate supply conduits to the top of each contactor. The whole unit of preheating hopper and contactors is enclosed in a furnace arranged to maintain a suitable contacting temperature allowing for the exothermicity of the ferrous chloridealuminium metal reaction. The second contactor is connected via a conduit for gaseous aluminium chloride to a cyclone arranged for the removal of ferrous chloride dust, and thence to an aluminium chloride condenser having a solid aluminium chloride removal means, and a residual gas removal conduit connected to a recirculating water scrubber arranged to scrub the residual chlorides such as silicon tetrachloride and titanium tetrachloride from the gases exited from the condenser to generate dilute hydrochloric acid. The scrubber is connected to an acid treatment vessel arranged for the receipt of aluminium particles removed from the contactors and, the treatment of the particles with the dilute acid and means are provided for the return of the thus treated particles to the hopper via water washing and drying means.

The apparatus was utilized by feeding into the first contactor vessel, loaded with aluminium pellets 5 mm in diameter, the dedusted aluminium chloride effluent gas from a process comprising the chlorination beneficiation of Ghanaian bauxite containing 70% wt of alumina and 16.5% ferric oxide to reduce its ferric oxide content to 1.7% followed by the chlorination of the impure alumina residue to produce the gaseous aluminium chloride effluent above referred to containing 12,000 ppm of ferric chloride together with smaller quantities of titanium and silicon chlorides. In a first trial the contactors were filled with the aluminium pellets to form a homogenous bed and the furnace was controlled to produce an average temperature of 400° C. in the contactors. The pellets sintered together rapidly and could not be operated after 20 minutes had elapsed.

In the main experiment the contactors were filled with 1:1 volume mixture of the aluminium pellets and of similarly sized particles of anthracite which had been devolatilized for 30 minutes at 800° C. and thereafter leached with 15% hydrochloric acid for 120 minutes washed, and dried at 150° C. The flow of solids through each of the contactors was controlled at 2 liters/10 minutes. The cyclone was operated at 180°–185° C. and the aluminium chloride condenser at 70° C.

The recirculating water scrubber was operated to produce 15% wt hydrochloric acid which was used to treat the 4 liter/10 minutes of mixed aluminium/carbon particles removed from the contactors as taught hereinbefore using a contact time between 1 and 5 minutes and a drying temperature of 100° C. The washed and dried acid-treated bed material was returned to the hopper. In this manner the process was operated for 11 hours. The solid aluminium chloride removed from the condenser contained 490 ppm Fe on average reaching 240 ppm Fe at peak product quality and was pale-yellow in color and free flowing.

By-product flows from the system were dust containing ferrous chloride from the cyclone, waste dilute acid containing redissolved values of metallic iron from the acid treatment vessel and waste gases comprising inert gases and carbon oxides from the water scrubber.

In accordance with the process of this invention, aluminium chloride contaminated with iron chloride can be purified by contacting a vaporous stream thereof in a moving packed bed process with a bed comprising bed solids of aluminium metal particles and chemically inert (non-reactive) material particles. The aluminium metal particles and inert particles are both between about 2 and 10 millimeters in diameter and the volumetric ratio of said inert particles to aluminium particles can be between 0.8:1 and 2:1. The vaporous aluminium chloride stream containing iron chloride contacts the bed of aluminium and inert particles whereby iron chloride reacts with the aluminium metal particles to form iron-aluminium particles. The newly formed iron-aluminium particles from time to time are removed from the bed whereupon the iron is removed from the iron-aluminium particles to produce clean aluminium particles which can be returned to the bed. The iron can be removed from the iron-aluminium particles by mechanical means such as in a sand mill or by chemical means such as contacting with dilute aqueous acid. In a desirable variation of the process, vaporous aluminium chloride, contacting the bed and having contaminating iron chloride mostly removed, produces a purified aluminium chloride vaporous stream containing possibly very minor amounts of low melting chlorides, whereupon this purified stream can be contacted with water to produce a dilute hydrochloric acid solution. The dilute hydrochloric acid solution formed advantageously has a concentration between 10% and 15% by weight which can be recycled to the main process step of removing iron from the iron-aluminium particles by chemical acid means. In still another desirable variation of the process, the bed can be a moving packed bed and can be continuously removed and replenished at the rate of about 5% to 30% by volume of bed per hour.

By moving packed bed is meant a packed bed of particles in contact with each other and moving either downwards under the action of gravity as a result of material being removed from the bottom of the bed and added at the top, or upwards under the action of additions being made at the base of the bed via a solids pump, and bed being removed from the top.

The foregoing describes and illustrates preferred embodiments of this invention directed to removing contaminated iron from aluminium chloride by contacting the same in a moving packed bed process with a bed comprising aluminium metal particles interspersed with inert material particles, but is not intended to be limiting as set forth in the appended claims.

I claim:

1. In a process for purifying aluminium chloride contaminated with iron chloride, comprising:
   contacting a vaporous stream of aluminium chloride containing iron chloride at a temperature below the melting point of aluminum but at least 350° C. with a packed bed comprising bed solids of aluminium metal particles interpersed with particles of non-reactive material where both types of particles have a particle size between 2 millimeters and 10 millimeters, the volumetric ratio of said inert material particles to said aluminium metal particles being between 0.8:1 and 2:1;
   depositing iron chloride on aluminium particles to produce iron-aluminium particles;
   removing iron-aluminium particles from the packed bed;
   removing the metallic iron from the iron-aluminium particles to produce clean aluminium particles.

2. The process in claim 1 wherein the metallic iron is removed from the iron-aluminium particles by contacting said iron-aluminium particles with dilute aqueous acid.

3. The process in claim 2 wherein the concentration of said acid is between about 10% and 50% acid by weight.

4. The process in claim 2 where the contact with dilute aqueous acid is for between 1 to 5 minutes.

5. The proess in claim 1 where the metallic iron is removed from the iron-aluminium particles by mechanical action.

6. The process in claim 5 where the mechanical action is sand milling.

7. The process in claim 1 wherein the packed bed process is a moving packed bed.

8. The process in claim 7 wherein the vaporous aluminium chloride stream is moving countercurrent to the moving bed.

9. The process in claim 1 wherein the clean aluminium particles are dried and the dried aluminium particles are returned to the bed.

10. In the process in claim 1 wherein the vaporous aluminium chloride, after contacting said bed, is condensed by contacting with water to produce a dilute aqueous solution of hydrochloric acid.

11. The process in claim 10 wherein the dilute hydrochloric acid produced has a concentration above 10% and said dilute hydrochloric acid is recycled to the step of contacting the iron-aluminium particles to remove metallic iron from the iron-aluminium particles.

12. The process in claim 10 where the vaporous aluminium chloride is passed through a heated cyclone between 187° C. and 250° C. to remove ferrous chloride dust and the residue of aluminium chloride is contacted with water.

13. The process in claim 1 wherein the chemically inert material is coke.

14. The process in claim 1 wherein the bed solids are continuously removed at the rate of 8% to 25% by volume per hour and said bed solids are replenished at approximately the same rate.

* * * * *